United States Patent
Yoon et al.

(10) Patent No.: US 8,843,614 B2
(45) Date of Patent: Sep. 23, 2014

(54) APPARATUS AND METHOD FOR DISTRIBUTING CLOUD COMPUTING RESOURCES USING MOBILE DEVICES

(75) Inventors: Changwoo Yoon, Daejeon (KR); Won Ryu, Daejeon (KR); Hyun-Woo Lee, Daejeon (KR); Kwihoon Kim, Daejeon (KR); Nam-Kyung Lee, Daejeon (KR); Seng-Kyoun Jo, Chungbuk (KR); Ho-Yeon Lee, Gyeonggi-do (KR); Eui-Nam Huh, Gyeonggi-do (KR); Seung-Min Han, Gyeonggi-do (KR)

(73) Assignees: Electronics and Telecommunications Research Institute, Daejeon (KR); University-Industry Cooperation Group of Kyung Hee University, Gyeonggi-do (KR)

( * ) Notice: Subject to any disclaimer, the term of this patent is extended or adjusted under 35 U.S.C. 154(b) by 231 days.

(21) Appl. No.: 12/857,935

(22) Filed: Aug. 17, 2010

(65) Prior Publication Data

US 2011/0153812 A1    Jun. 23, 2011

(30) Foreign Application Priority Data

Dec. 21, 2009  (KR) .................. 10-2009-0128522
Mar. 9, 2010   (KR) .................. 10-2010-0021031

(51) Int. Cl.
  *G06F 15/173*  (2006.01)
(52) U.S. Cl.
  USPC .................. 709/224; 709/223; 715/853
(58) Field of Classification Search
  CPC ................. H04L 63/20; H04L 67/10
  USPC ..................................... 709/224
  See application file for complete search history.

(56) References Cited

U.S. PATENT DOCUMENTS

| | | | |
|---|---|---|---|
| 2002/0075325 A1* | 6/2002 | Allor et al. ............... | 345/853 |
| 2005/0278441 A1 | 12/2005 | Bond et al. | |
| 2006/0031509 A1 | 2/2006 | Ballette et al. | |
| 2010/0077069 A1* | 3/2010 | Kim .......................... | 709/223 |

FOREIGN PATENT DOCUMENTS

| | | | |
|---|---|---|---|
| KR | 1020010041175 | | 5/2001 |
| KR | 1020010042426 | | 5/2001 |
| KR | 1020080103535 | | 11/2008 |
| WO | WO 2008/066277 | * | 6/2008 |

OTHER PUBLICATIONS

Yoon, Changwoo et al., "Dynamic Collaborative Cloud Service Platform: Opportunities and Challenges," ETRI Journal, vol. 32(4):634-637 (2010).

(Continued)

*Primary Examiner* — Hua Fan
(74) *Attorney, Agent, or Firm* — Nelson Mullins Riley & Scarborough LLP

(57) ABSTRACT

An apparatus for distributing mobile resources in a cloud computing environment includes: a resource register configured to analyze, when a request for mobile resource registration is inputted by a user, the requested resource and confirm if the resource is registerable; a provisioning manager configured to create a MVO, when the mobile resource is a registerable resource, and register the mobile resource; a metadata repository configured to store metadata information regarding the registered mobile resource; and a resource manager configured to control the provisioning manager, when the resource register receives a request for the resource registration, so as to create a MVO, register the resource, and store metadata regarding the registered mobile resource information.

8 Claims, 3 Drawing Sheets

(56) References Cited

OTHER PUBLICATIONS

Choi, SookKyong et al., "Group-based Resource Selection Algorithm Supporting Fault-tolerance in Mobile Grid," Third International Conference on Semantics, Knowledge and Grid, pp. 426-429 (2007).

Han, Seung-Min et al., "Efficient Service Recommendation System for Cloud Computing Market," ICIS, ACM Proceedings of the 2nd International Conference on Interaction Sciences: Information Technology, Culture and Human, pp. 839-845 (2009).

Hwang, Junseok et al., "Middleware Services for P2P Computing in Wireless Grid Networks," IEEE Internet Computing, vol. 8(4):40-46 (2004).

Li, Gang et al., "A survey on Wireless Grids and Clouds," 2009 Eighth International Conference on Grid and Cooperative Computing, pp. 261-267 (2009).

* cited by examiner

APPARATUS AND METHOD FOR DISTRIBUTING CLOUD COMPUTING RESOURCES USING MOBILE DEVICES

CROSS-REFERENCE(S) TO RELATED APPLICATIONS

The present application claims priority of Korean Patent Application Nos. 10-2009-0128522 and 10-2010-0021031, filed on Dec. 21, 2009, and Mar. 9, 2010, respectively, which are incorporated herein by reference in their entirety.

BACKGROUND OF THE INVENTION

1. Field of the Invention

Exemplary embodiments of the present invention relate to an apparatus and a method for distributing cloud computing resources; and, more particularly, to an apparatus and a method for distributing mobile cloud computing resources using resources of mobile devices.

2. Description of Related Art

In general, cloud computing refers to a user environment in which programs or materials are stored in a main computer, which can be accessed through the Internet, so that desired operations can be performed remotely using various terminals such as PCs and cellular phones.

A user can perform a computing operation at any place as long as he/she has a terminal having Internet access and computing functions. As used herein, the cloud refers to a group of computers for providing services. In other words, cloud computing refers to computing based on a large number of PCs or servers that constitute a cloud-like group.

It can be said that the cloud computing provides a large number of customers with IT resources, which have a high level of extensibility, using Internet technology. In a cloud computing environment, users can access a large-capacity computer set through terminals connected to the Internet and selectively use as much IT resources (e.g. application, storage, OS, security) as needed at a desired time, with payment being made based on the amount of use.

Using distributed processing and virtualization technologies, cloud computing enables users to easily lend storages, networks, platforms, and computing resources.

The cloud computing corresponds to an abstract form of computing infrastructure group, which contains various application programs, and which is well managed and highly scalable. This concept is a combination of utility computing or Software as a Service (SaaS) and grid computing.

Specifically, clouding computing is similar to the utility computing or SaaS in that users pay as much as they use hardware or software computing resources, and also incorporates the concept of grid computing in that resource providers aggregate distributed various computing resources which then can be used as a single computing resource.

In general, grid technology based on applied distributed processing technology is employed to process a large amount of data. Development of distributed processing technology and change of business environment in the industry have caused needs for new computing environment. Cloud computing has been brought into existence in this connection, and various services have been developed using it.

Various types of research have been performed so far to distribute various resources (e.g. storage, computing, and network) in cloud computing, make notifications, and calculate costs. However, there has been little study on a management system for registering various resources in a mobile cloud environment and providing a mobile cloud.

SUMMARY OF THE INVENTION

An embodiment of the present invention is directed to an apparatus and a method for distributing cloud computing resources using mobile devices, which can integrate mobile resources to create a mobile cloud, and which can provide various services using the mobile cloud.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for distributing mobile resources in a cloud computing environment includes: a resource register configured to analyze, when a request for mobile resource registration is inputted by a user, the requested resource and confirm if the resource is registerable; a provisioning manager configured to create a Mobile Virtual Organization (MVO), when the mobile resource is a registerable resource, and register the mobile resource; a metadata repository configured to store metadata information regarding the registered mobile resource; and a resource manager configured to control the provisioning manager, when the resource register receives a request for the resource registration, so as to create a MVO, register the resource, and store metadata regarding the registered mobile resource information.

The apparatus may further include: a task processing unit configured to divide the mobile resource registered in the MVO, so as to use the mobile resource, into tasks to be processed in the MVO, transfer the tasks to the resource manager so that the tasks are processed in the MVO, and receive tasks processed in the MVO from the resource manager; and a service input/output unit configured to receive a request for a service from the user so as to use a mobile resource registered in the MVO, transfer the requested service to the task processing unit, and inform the user of a service result processed in the MVO in response to the request.

In accordance with another embodiment of the present invention, a method for distributing mobile resources in a cloud computing environment includes: analyzing, when a request for mobile resource registration is inputted by a user, the requested resource to confirm if the resource is registerable; creating a MVO, when the mobile resource is a registerable resource, registering the mobile resource, and storing metadata information regarding the registered mobile resource; and creating a MVO, when a request for the resource registration is inputted, registering the resource, and storing metadata regarding the registered mobile resource information.

DESCRIPTION OF SPECIFIC EMBODIMENTS

Figure 1:
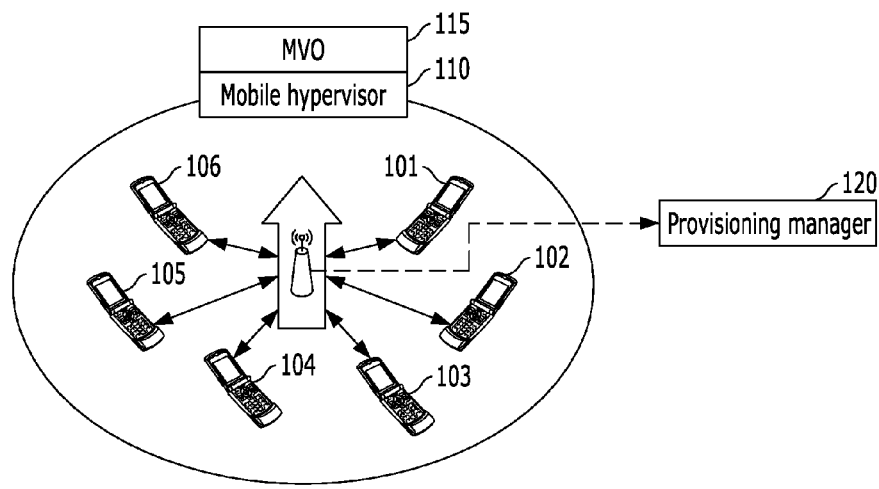
FIG. 1 illustrates the construction of a mobile hypervisor in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 illustrates the construction of a mobile hypervisor in accordance with an embodiment of the present invention.

Referring to FIG. 1, the mobile hypervisor 110 includes a number of user terminals 101, 102, 103, 104, 105, and 106, a repeater 108 configured to communicate with the user terminals, and a provisioning manager 120 configured to manage resources of the user terminals.

The mobile hypervisor 110 in FIG. 1 is configured to virtualize mobile resources and construct a mobile cloud. Specifically, a mobile cloud constructed through the provisioning manager 120 is designated as a Mobile Virtual Organization (MVO) 115 and managed.

The core role of constructing the MVO 115 is played by the mobile hypervisor 110, which groups mobile resources and creates a MVO 115.

The MVO 115 is configured to group physical mobile devices, which have been registered by users, and process tasks. A service, the processing of which has been requested by a user, is divided into tasks, which can be processed in the MVO 115, and the tasks are processed in the MVO 115 constructed by the mobile hypervisor 110.

The mobile hypervisor 110, in order to construct a stable MVO 115 together with the provisioning manager 120, can receive metadata from a resource manager (described later with reference to FIG. 3) to maintain the MVO.

Figure 2:
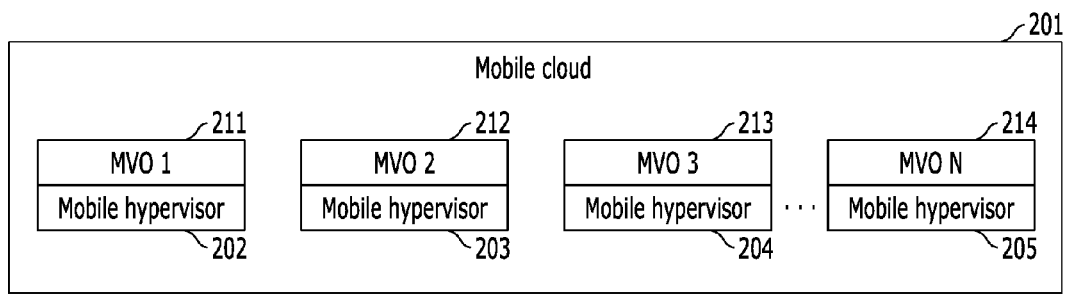
FIG. 2 illustrates the structure of a mobile cloud in accordance with an embodiment of the present invention.

FIG. 2 illustrates the structure of a mobile cloud in accordance with an embodiment of the present invention.

The mobile cloud 201 may include MVO 1 211, MVO 2 212, MVO 3 213, and MVO 214, which are obtained by grouping mobile resources by mobile hypervisors 202, 203, 204, and 205, respectively.

When a user wants to register his/her mobile resource, he/she constructs a MVO through a repeater, which is at the shortest distance from the mobile resource to be registered. Alternatively, the mobile resource is integrated into the closest MVO. The above-mentioned operation may be determined based on metadata of a resource manager (described later with reference to FIG. 3) and performed by the provisioning manager 120.

The grouping illustrated in FIG. 2, i.e. MVO 1 211, MVO 2 212, MVO 3 213, and MVO 214, makes it possible to construct dynamic MVOs, not stationary mobile resources. Therefore, when a user wants to register his/her resource, he/she can provide a MVO with his/her mobile resource through a register manager without going through a complicated process, and claim the relevant cost.

In addition, the present invention enables cooperation between different types of mobile devices, as well as processing of a complicated service using a number of MVOs.

Figure 3:
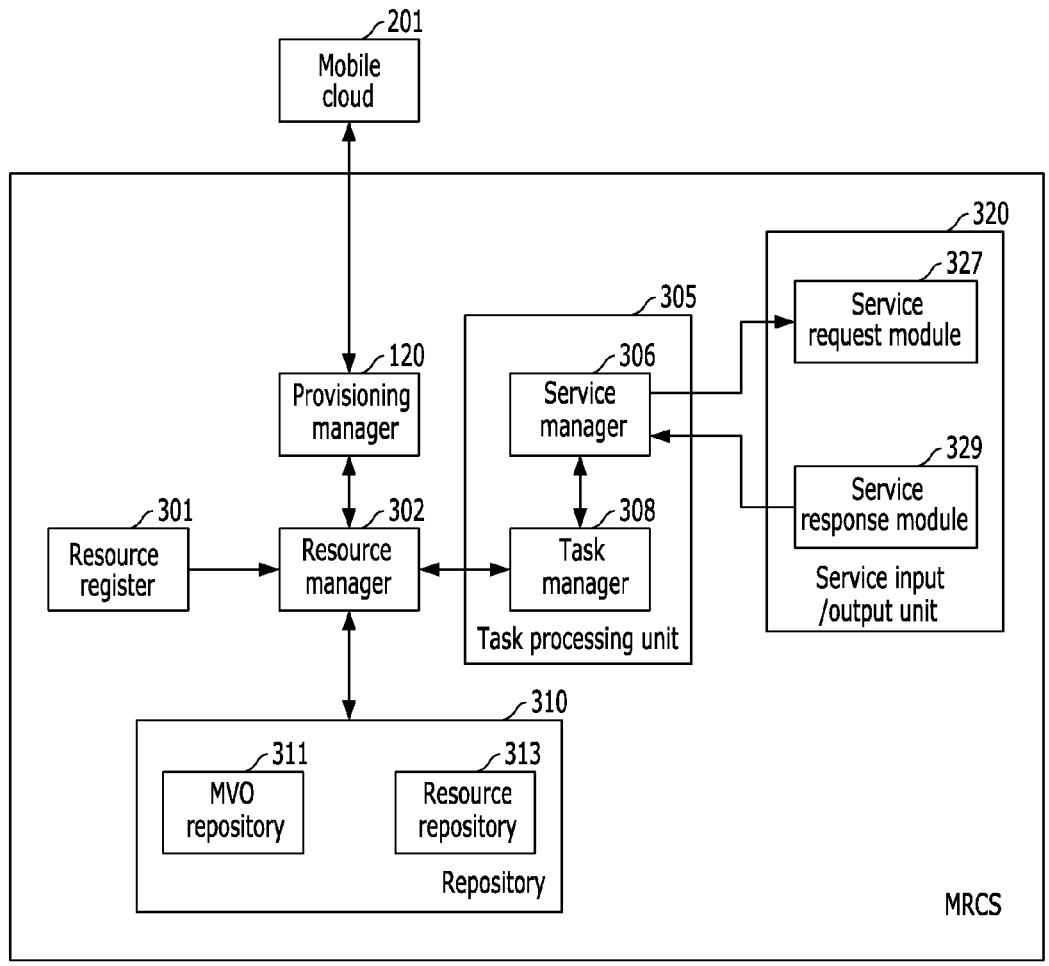
FIG. 3 illustrates the overall system construction of an apparatus for distributing cloud computing resources using mobile devices in accordance with an embodiment of the present invention.

FIG. 3 illustrates the system construction of an apparatus for distributing cloud computing resources using mobile devices in accordance with an embodiment of the present invention.

The Mobile Resource Control System (MRCS) 300 in FIG. 3 refers to a management system configured to create a mobile cloud through a mobile hypervisor, which is configured to virtualize mobile resources, and process a service.

The MRCS 300 may include a resource register 301, a resource manager 302, a provisioning manager 120, a metadata repository 310, a task processing unit 305, and a service input/output unit 320.

The metadata repository 310 includes a resource repository 313 and a MVO repository 311.

The task processing unit 305 includes a service manager 306 and a task manager 308.

The service input/output unit 320 includes a service request module 307 and a service response module 309.

When a user wants to utilize his/her mobile device using the MRCS 300, he/she registers his/her resource through the resource register 301.

The resource manager 302 is configured to manage resources, when a request for resource registration comes in from the resource register 301, and include the resources in the mobile cloud through the provisioning manager 120. A cloud group constructed through the above-mentioned operation is referred to as a Mobile Virtual Organization (MVO). The MVO, by constructing various mobile clouds based on different regional or spatial conditions, can be utilized for service processing.

The resource register 301 is configured to confirm if a mobile resource is registerable. In the case of a registerable mobile resource, metadata regarding the mobile resource to be registered is stored in the resource repository 313 through the resource manager 302 with the position of a repeater, to which the user is connected, and information regarding the mobile resource.

The metadata refers to attribute information, specifically data assigned to contents according to predetermined rules so that, from a large amount of information, desired information can be found and used efficiently.

The metadata contains the position and detail of contents, information regarding the author, conditions of rights, conditions of use, history of use, etc. For example, computers commonly use metadata to express data and quickly find data.

Another purpose of metadata is to find data quickly, and metadata serves as an index of information in computers. Therefore, users can use metadata to easily find desired specific data through search engines, for example.

The MRCS system 300 in accordance with the present invention stores and uses two types of metadata. The metadata is stored in the metadata repository 310, which includes a MVO repository 311 and a resource repository 313.

The MVO repository 311 stores a group of various mobile resources which are integrated into a mobile cloud and which are virtually distributed as system units to construct MVOs. The MVO repository 311 contains metadata regarding constructed MVOs, and stores parts regarding the current condition, performance, and price of MVOs.

The resource repository 313 stores information regarding the condition of a mobile resource, which a mobile user wants to be registered, specifically stores metadata regarding contracts and current conditions of provided mobile resources.

The resource manager 302 is configured to store registered mobile resources in the resource repository 313 in a metadata type and prepare for mobile cloud construction. Specifically, the resource manager 302 registers and distributes mobile resources in the mobile cloud, and supervises all operations regarding cost calculation of the registered mobile resources.

The resource manager 302 includes a resource monitoring unit (not shown) configured to monitor the degree of utilization of the registered and distributed resources, and a grade setting unit (not shown) configured to measure the performance of resources and set their grade.

The resource manager 302 is configured to store metadata information regarding MVOs, which have been constructed through the provisioning manager 120, in the MVO repository 304 and manages the information. The resource manager 302 uses the MVO repository 304 to find a registerable MVO and uses the provisioning manager 120 to construct a MVO.

The task processing unit 305 is configured to process a service for utilizing the created MVO, and includes a service manager 306 and a task manager 308. The service manager 306 is configured to receive a service which has been requested by the user using the service request module 307 of the service input/output unit 320.

The service manager 306 is configured to divide the service, which has been received from the service request module 307, into tasks that can be processed by the MVO and transfer the tasks to the task manger 308.

The task manager 308 is configured to manage the tasks received from the service manager 306 and transfer the received tasks to the resource manager 302.

The resource manager 302 is configured to consider which MVO can process the received tasks most efficiently and transfer the tasks to the MVO through the provisioning manager 120 for processing.

The resource manager 302 is configured to receive tasks processed in the MVO through the provisioning manager 120 and provide the task manager with the processed tasks.

The task manager 308 is configured to check errors of the processed tasks and transfer the tasks to the service manager 306. The service manager 306 is configured to provide the service user, who has made the request, with the processed tasks through the service response module 329.

The task manager 308 services as a kind of queue, and is configured to deal with errors regarding mobility of the mobile cloud and manage tasks for error processing regarding service processing. As used herein, the queue refers to a material structure enumerating a number of data items in a predetermined order.

The resource manager 301 may select a MVO, which has the least tasks currently in progress, and utilize integrated mobile resources using the mobile hypervisor.

The resource manager 302 is configured to receive tasks processed in the MVO through the provisioning manager 120 and transfer the tasks to the task manager 308. The task manager 308 is configured to receive tasks processed in the MVO and, when the processing requested by the service manager 306 has been processed normally, transfer the result of service processing to the user, who has requested the service, using the service response module 329.

Figure 4:
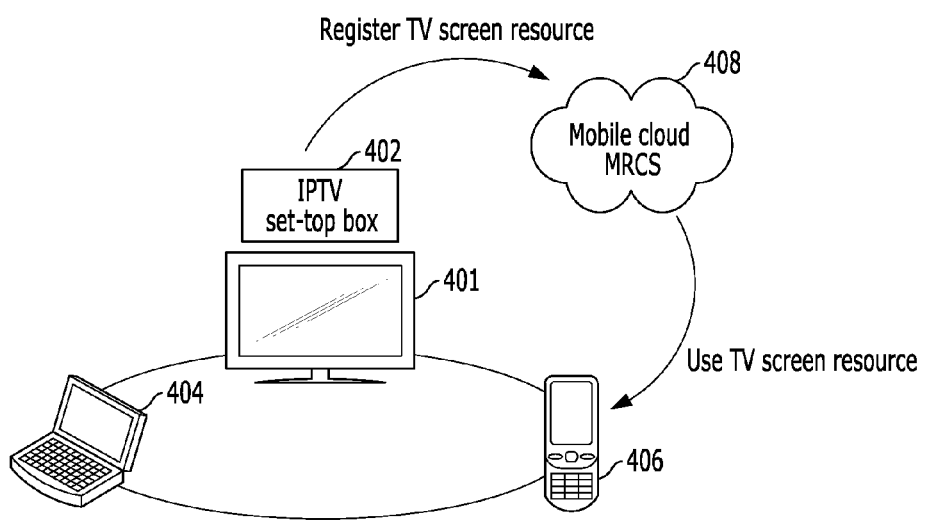
FIG. 4 illustrates an exemplary cloud computing resource service using mobile devices in accordance with an embodiment of the present invention.

FIG. 4 illustrates an exemplary cloud computing resource service using mobile devices in accordance with an embodiment of the present invention.

The present invention can be used for a multiscreen service of an IPTV system, as illustrated in FIG. 4. The system in accordance with an embodiment of the present invention illustrated in FIG. 4 may include a TV 401, an IPTV set-top box 402 connected with the TV 401, a computer 404, a cellular phone 406, and a mobile cloud MRCS 408.

When the user wants to watch a media file, which is stored in the cellular phone 406, on the TV 401, he/she registers the screen of the TV 401 as a resource in the mobile cloud MRCS 408. Then, the user registers use of the TV screen resource through the cellular phone, so that the TV screen can be used like a local resource of the cellular phone. Consequently, a multiscreen service is implemented simply by playing media on the TV screen, which has been registered as a local resource.

As described above, the present invention uses various mobile devices to construct a MVO through a mobile hypervisor, and also constructs a mobile cloud environment providing a mobile virtualization environment.

The present invention proposes a method for utilizing mobile resources through a system, which can be applied to various mobile services, and a high-performance mobile cloud can be constructed by utilizing mobile devices, the level of which is on the increase.

Users providing the mobile cloud with their mobile resources are given opportunities to benefit from their mobiles. Processes of distributing cloud computing resources using mobile devices in accordance with an embodiment of the present invention will be described in more detail with reference to FIG. 5.

Figure 5:
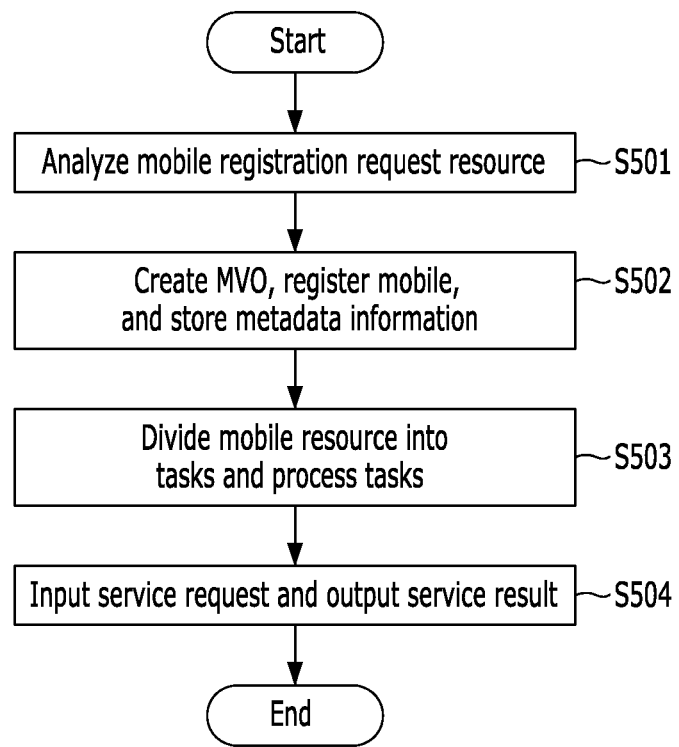
FIG. 5 illustrates processes of distributing cloud computing resources using mobile devices in accordance with an embodiment of the present invention.

Referring to FIG. 5, when a user wants to utilize his/her mobile device using the MRCS 300, the user registers his/her resource through the resource register 301 at step S501. The resource manager 302 then manages the resource and includes the resource in the mobile cloud through the provisioning manager 120. A cloud group constructed through the above-mentioned operation is referred to as a Mobile Virtual Organization (MVO). The MVO, by constructing various mobile clouds based on different regional or spatial conditions, can be utilized for service processing.

The resource register 301 confirms if the mobile resource is registerable at step S502. In the case of a registerable mobile resource, metadata regarding the mobile resource to be registered is stored in the resource repository 313 through the resource manager 302 with the position of a repeater, to which the user is connected, and mobile resource information.

The metadata refers to attribute information, specifically data assigned to contents according to predetermined rules so that, from a large amount of information, desired information can be found and used efficiently. The metadata contains the position and detail of contents, information regarding the author, conditions of rights, conditions of use, history of use, etc. For example, computers commonly use metadata to express data and quickly find data. Another purpose of metadata is to find data quickly, and metadata serves as an index of information in computers. Therefore, users can use metadata to easily find desired specific data through search engines, for example.

The service manager 306 divides the service, which has been received from the service request module 307, into tasks that can be processed by the MVO and transfers the tasks to the task manger 308 at step S503. The task manager 308 manages the tasks received from the service manager 306 and transfers the received tasks to the resource manager 302. The resource manager 302 considers which MVO can process the received tasks most efficiently and transfers the tasks to the MVO through the provisioning manager 120 for processing.

The resource manager 302 receives tasks processed in the MVO through the provisioning manager 120 and transfers the tasks to the task manager 308 at step S504. The task manager 308 receives the tasks processed in the MVO and, when the processing requested by the service manager 306 has been processed normally, transfers the result of service processing to the user, who has requested the service, using the service response module 329.

In accordance with the exemplary embodiments of the present invention, various mobile resources are used to create economic benefits to individuals, and are also utilized for services including a Location-Based Service (LBS), a local Social Network Service (SNS), etc. As such, mobile resources are used to develop various, new types of services, which are provided at a reduced cost.

While the present invention has been described with respect to the specific embodiments, it will be apparent to those skilled in the art that various changes and modifications may be made without departing from the spirit and scope of the invention as defined in the following claims.

What is claimed is:

1. A computing apparatus for distributing mobile resources using a mobile device in a cloud computing environment, comprising:
    a network interface; and
    a processor for executing instructions, the computing apparatus further including:
        a resource register configured to register a plurality of mobile resources of mobile terminals in response to a plurality of requests for registration of the plurality of mobile resources, which are sent to the computing apparatus from plurality of mobile terminals respectively;
        a metadata repository configured to store metadata information regarding the plurality of mobile resources registered by the resource register;
        a control manager configured to create at least one Mobile Virtual Organization (MVO) with at least one of the plurality of mobile resources registered by the resource register, or to modify at least one existing MVO through addition of at least one of the plurality of mobile resources registered by the resource register as a new component of the existing MVO or through deletion of at least one mobile resource included in the existing MVO; and
        a service unit configured to divide a service requested from a user terminal , into tasks to be processed by an assigned MVO, and to transfer the tasks processed by the assigned MVO to the user terminal,
    wherein the control manager assigns at least one MVO in the created and existing MVO as the assigned MVO to process the tasks divided by the service unit, transfers the tasks from the service unit to the assigned MVO, and transfers the tasks processed by the assigned MVO to the service unit, and the assignment of the control manager is based on processing efficiency of each of the created and existing MVO, and
    wherein the metadata information includes a position information of a repeater connected to each of the plurality of mobile terminals, information about each of the plurality of mobile resources registered by the resource register and information about the created and existing MVO.

2. The apparatus of claim 1, wherein the control manager distributes the plurality of mobile resources registered by the resource register in the cloud computing environment.

3. The apparatus of claim 1, wherein the control manager includes a resource monitoring unit configured to monitor a degree of utilization of the plurality of mobile resources registered by the resource register.

4. The apparatus of claim 3, wherein the control manager further includes a grading unit configured to grade performance of the plurality of mobile resources, registered by the resource register based on the result of monitoring of the resource monitoring unit.

5. A method for distributing mobile resources in a cloud computing environment, the method performed by a computing apparatus, the method comprising:
    registering a plurality of mobile resources of mobile terminals in response to a plurality of requests for registration of the plurality of mobile resources, which are sent to the computing apparatus from users of the plurality of mobile terminals respectively;
    storing metadata information regarding the plurality of mobile resources registered;
    creating at least one Mobile Virtual Organization (MVO) with at least one of the plurality of mobile resources registered, or modifying at least one existing MVO through addition of at least one of the plurality of mobile resources registered as new component of the existing MVO or through deletion of at least one mobile resource included in the existing MVO;
    dividing a service requested from a user terminal into tasks to be processed by an assigned MVO; and
    transferring the tasks processed by the assigned MVO to the user terminal, wherein at least one MVO in the created and existing MVO is assigned as the assigned MVO to process the divided tasks, and the assignment is based on processing efficiency of each of the created and existing MVO, and
    wherein the metadata information includes a position information of a repeater connector to each of the plurality of mobile terminals, information about each of the plurality of mobile resources registered, and information about the created and existing MVO.

6. The method of claim 5, further comprising distributing the plurality of mobile resources registered in the cloud computing environment.

7. The method of claim 5, further comprising monitoring a degree of utilization of the plurality of mobile resources registered.

8. The method of claim 7, further comprising grading a performance of the plurality of mobile resources registered based on a result of the monitoring.

* * * * *